US007029182B2

(12) United States Patent
Ngo

(10) Patent No.: US 7,029,182 B2
(45) Date of Patent: *Apr. 18, 2006

(54) ANGLED OPTICAL CONNECTOR ADAPTER MOUNTING ASSEMBLY

(75) Inventor: Hung Viet Ngo, Harrisburg, PA (US)

(73) Assignee: FCI Americas Technology, Inc., Reno, NV (US)

(*) Notice: Subject to any disclaimer, the term of this patent is extended or adjusted under 35 U.S.C. 154(b) by 331 days.

This patent is subject to a terminal disclaimer.

(21) Appl. No.: 10/087,433

(22) Filed: Mar. 1, 2002

(65) Prior Publication Data

US 2003/0165298 A1    Sep. 4, 2003

(51) Int. Cl.
*G02B 6/36* (2006.01)

(52) U.S. Cl. .......................... 385/53; 385/55

(58) Field of Classification Search ................ 385/53, 385/54, 59, 56, 66, 71, 75, 84, 114, 115
See application file for complete search history.

(56) References Cited

U.S. PATENT DOCUMENTS

| 5,082,338 | A |   | 1/1992  | Hodge ................... 385/81    |
| 5,317,663 | A | * | 5/1994  | Beard et al. ............... 385/70 |
| 5,333,222 | A | * | 7/1994  | Belenkiy et al. ............ 385/70 |
| 5,432,875 | A |   | 7/1995  | Korkowski et al. .......... 385/27  |
| 5,511,798 | A |   | 4/1996  | Kawamoto et al. ......... 277/205   |
| 5,645,449 | A |   | 7/1997  | Sabo ..................... 439/540   |
| 5,647,766 | A |   | 7/1997  | Nguyen ................... 439/620   |
| 5,825,955 | A | * | 10/1998 | Ernst et al. ................ 385/79 |
| 5,896,478 | A |   | 4/1999  | Dauber et al. .............. 385/53  |
| 5,923,805 | A |   | 7/1999  | Anderson et al. ............ 385/86  |
| 5,975,953 | A |   | 11/1999 | Peterson ................... 439/607 |
| 6,027,252 | A | * | 2/2000  | Erdman et al. .............. 385/76  |
| 6,079,881 | A | * | 6/2000  | Roth ....................... 385/76   |
| 6,134,370 | A | * | 10/2000 | Childers et al. ............ 385/135 |
| 6,146,192 | A | * | 11/2000 | Cabalka et al. ........... 439/540.1 |
| 6,158,899 | A |   | 12/2000 | Arp et al. .................. 385/53  |
| 6,160,946 | A |   | 12/2000 | Thompson et al. .......... 385/134   |
| 6,186,670 | B1| * | 2/2001  | Austin et al. ............... 385/55 |
| 6,305,961 | B1| * | 10/2001 | Szilagyi et al. ............ 439/271  |
| 6,347,888 | B1| * | 2/2002  | Puetz ....................... 385/53  |
| 6,461,053 | B1| * | 10/2002 | Mayercik et al. ............. 385/56  |
| 6,496,642 | B1| * | 12/2002 | Gonzalez et al. ............ 385/136  |
| 6,508,593 | B1| * | 1/2003  | Farnsworth et al. .......... 385/55   |
| 6,568,861 | B1| * | 5/2003  | Benner et al. ............... 385/55  |

(Continued)

*Primary Examiner*—Juliana Kang
(74) *Attorney, Agent, or Firm*—Harrington & Smith, LLP

(57) ABSTRACT

An optical connector adapter mount for mounting optical connectors to a panel. The mount comprises a frame with a mounting section for attaching the mount to the panel. The frame has a housing section with an aperture adapted for connecting at least one multi-fiber optical connector with at least a row of multiple optical fibers to the housing section. The aperture in the housing has an axis of symmetry which is slanted relative to the mounting section. The axis of symmetry of the aperture is angled relative to a normal axis of panel when the mounting section is mounted to the panel. The connector connected to the housing section is oriented with the row of multiple optical fibers aligned generally vertically.

43 Claims, 6 Drawing Sheets

U.S. PATENT DOCUMENTS

| | | | |
|---|---|---|---|
| 6,572,272 B1 | 6/2003 | Ngo | 385/53 |
| 6,601,997 B1 | 8/2003 | Ngo | 385/86 |
| 6,623,170 B1 * | 9/2003 | Petrillo | 385/53 |
| 6,629,783 B1 | 10/2003 | Ngo | 385/86 |
| 6,634,801 B1 * | 10/2003 | Waldron et al. | 385/86 |
| 6,644,865 B1 * | 11/2003 | Chang et al. | 385/86 |
| 6,674,951 B1 * | 1/2004 | Erwin et al. | 385/134 |
| 6,688,780 B1 * | 2/2004 | Duran | 385/76 |
| 6,695,485 B1 * | 2/2004 | Estrella et al. | 385/53 |
| 6,863,446 B1 * | 3/2005 | Ngo | 385/72 |

\* cited by examiner

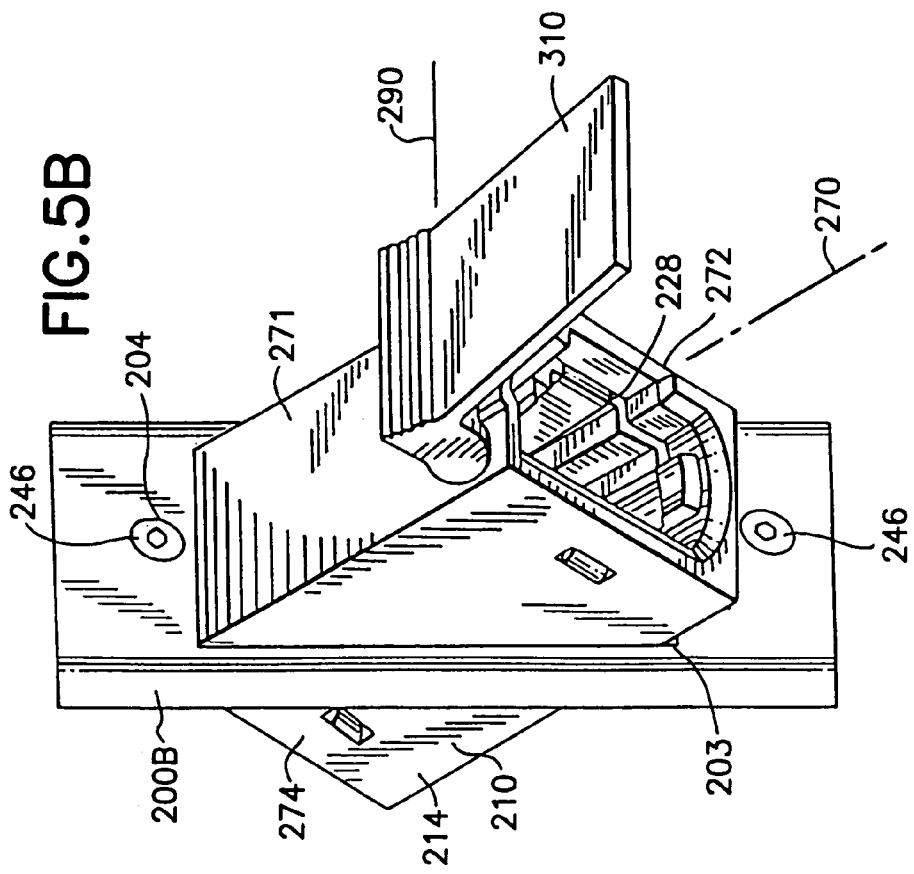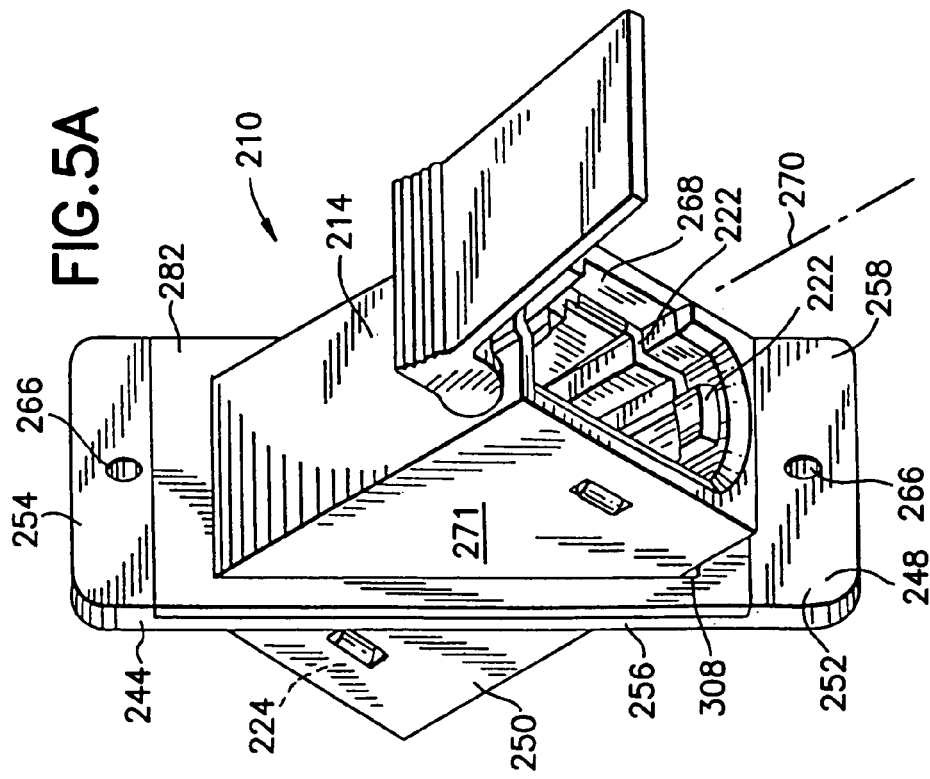

ANGLED OPTICAL CONNECTOR ADAPTER MOUNTING ASSEMBLY

BACKGROUND OF THE INVENTION

1. Field of the Invention

The present invention relates to optical connectors and, more particularly, to optical connector mounting assembly for connecting optical connectors at an angle to a frame on which the assembly is mounted.

2. Brief Description of Earlier Developments

Consumers have a continuing desire for ever smaller electronic devices. This desire on the part of consumers has caused manufacturers to seek new ways in which to further miniaturize the electronic devices being produced. However, miniaturization of electronic devices is limited by such factors, in the case of connectorized devices, as the size of the connectors to be connected to the device and correspondingly the size of the space used for insertion and removal of the connector from the device. Also, in the case of optical connectors, sufficient open area is provided behind the connector to avoid kinking or breaking the optical conductors extending from the connector. U.S. Pat. No. 5,896,478 discloses one example of an arrangement for receiving an optical fiber connector in a floor box of a device. The arrangement includes a receiving housing (for receiving an optical fiber connector) which is mounted in an enveloping housing in a fashion capable of rotating. Another example is provided in U.S. Pat. No. 5,645,449 which discloses an outlet with connections to multiple connector styles and media types including fiber optic cables which maintains appropriate minimum bend radii. U.S. Pat. No. 5,511,798 discloses still another example wherein an EMI gasket has grooves which hold an optical fiber. U.S. Pat. No. 6,158,899 discloses still another example wherein a conductive body covers an I/O cable as it emerges from the chassis of the device. As evident from the aforementioned examples, earlier arrangements for connecting optical conductors to a panel, do not provide a small open area behind or at the rear of the connector especially in the case of multifiber optical connectors such as MPO/MTP style connectors. These connectors are significantly larger than simplex optical connectors (e.g. SC or LC style connectors) and are used with cables having a row of optical fibers. The multifiber cables have an asymmetric cross-section which causes the cables to kink when the MPO/MTP connectors are mounted in a vertical configuration. The present invention overcomes the problems of the earlier arrangements as will be described in greater detail below.

SUMMARY OF THE INVENTION

In accordance with the first embodiment of the present invention, an optical connector adapter mount for mounting optical connectors to a panel is provided. The mount comprises a frame with a mounting section and a housing section. The mounting section is used for attaching the mount to the panel. The housing section has an aperture adapted for connecting at least one multifiber optical connector with at least a row of multiple optical fibers to the housing section. The aperture in the housing has an axis of symmetry which is slanted relative to the mounting section. The axis of symmetry of the aperture is angled relative to a normal access of the panel when the mounting section is mounted to the panel. The multi-fiber optical connector connected to the housing section is oriented with the row of multiple optical fibers aligned generally vertically.

In accordance with the second embodiment of the present invention, an optical connector mount for mounting optical connectors to a panel is provided. The mount comprises a mounting section, and a tubular housing section. The mounting section attaches the mount to the panel. The tubular housing section is connected to the mounting section. The tubular housing section has an aperture for connecting a multi-fiber optical connector to one end of the housing section. The housing section is slanted relative to the mounting section. When the mounting section is mounted to the panel, the connector connected to the housing section is angled relative to a normal axis of the panel and a row of optical fibers extending from the connector has a generally twisted shape.

In accordance with the third embodiment of the present invention, an optical connector mounting system is provided. The optical connector mounting system comprises an adapter mount, an adapter, and a boot. The adapter mount has a mounting section for mounting the adapter mount to a panel and a housing section depending from the mounting section. The adapter is located in housing section for coupling with a multi-fiber optical connector. The boot is connected to the connector. The boot positions a row of optical fibers terminated to the connector along a length of the optical fibers. When the connector is coupled to the adapter, the boot positions the row of optical fibers so that the row of optical fibers along the length of the connector has a predetermined shape.

BRIEF DESCRIPTION OF THE DRAWINGS

The foregoing aspects and other features of the present invention are explained in the following description, taken in connection with the accompanying drawings, wherein:

FIG. 5A is a perspective view of an optical connector adapter assembly incorporating features in accordance with a second preferred embodiment of the present invention;

FIG. 5B is another perspective view of the adapter assembly in FIG. 5A mounted to a panel;

DETAILED DESCRIPTION OF THE PREFERRED EMBODIMENT

Figure 1:
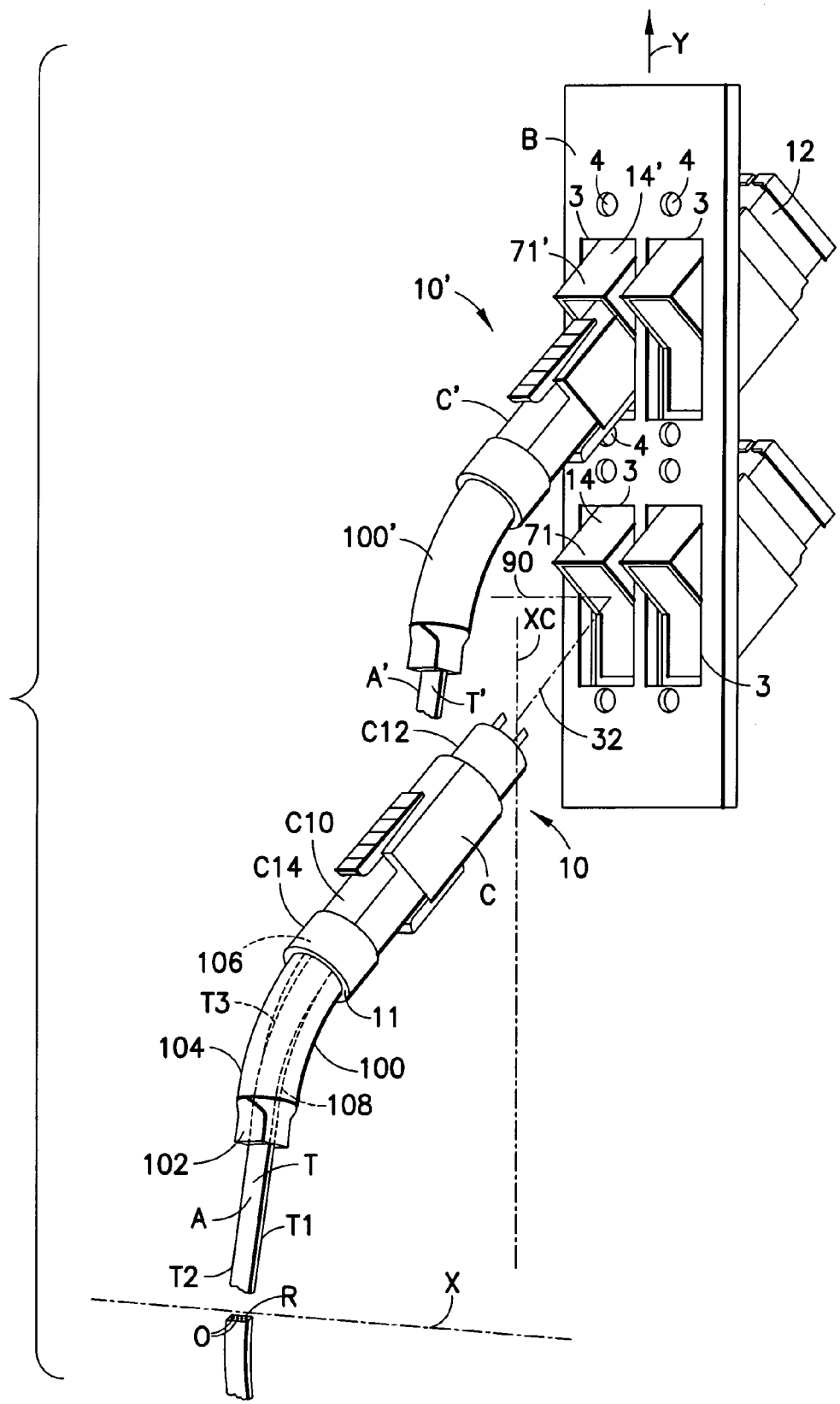
FIG. 1 is a exploded partial perspective view of two optical connector mounting systems for attaching optical connectors to a panel B (one mounting system being shown before mating of the connector), and two connectorized optical conductor assemblies A, A', the mounting systems incorporating features in accordance with a first preferred embodiment of the present invention.

Referring to FIG. 1, there is shown a perspective view of an optical connector mounting systems 10, 10' incorporating features in accordance with a first preferred embodiment of the present invention, and two connectorized optical conductor assemblies A, A'. Although the present invention will be described with reference to the single embodiment shown in the drawings, it should be understood that the present invention can be embodied in many alternate forms of embodiments. In addition, any suitable size, shape or type of elements or materials could be used.

FIG. 1 shows one optical connector mounting system 10 (attaching connector C of connectorized optical conductor assembly A to panel B). Panel B, of which only a portion is shown in FIG. 1, for example purposes, may be the back panel or part of the chassis of an electronic device (not shown). As shown, panel B may have an architecture which allows a number of connectorized optical conductor assemblies to be connected thereto. Mounting system 10 is substantially similar to mounting system 10' but is shown in FIG. 1 in a state with the connector C on conductor A' disconnected from the panel for example purposes. Accordingly, the optical connector mounting system will be described below with specific reference to mounting system 10 unless otherwise indicated.

Figure 2:
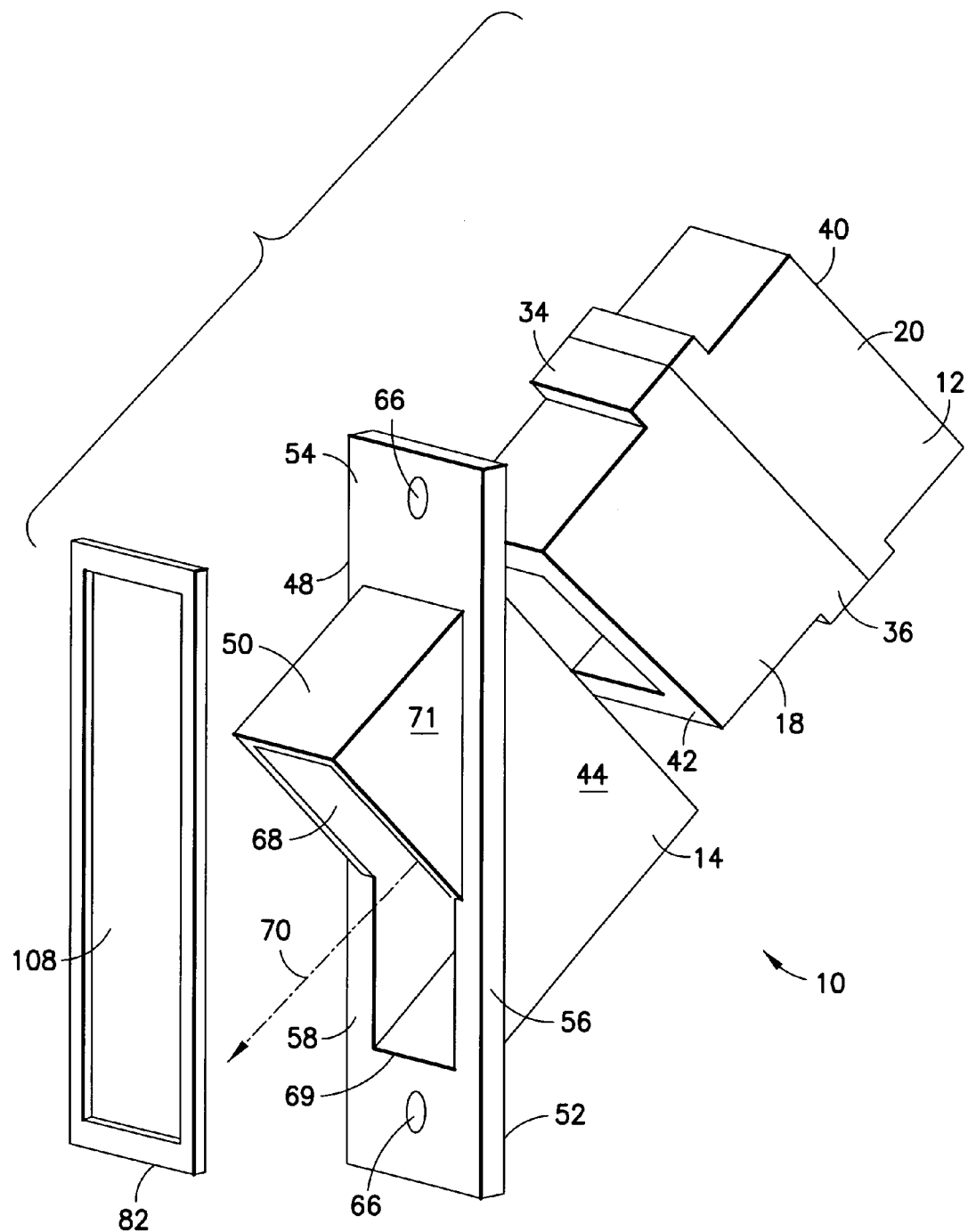
FIG. 2 is an exploded perspective view of an optical connector adapter, an adapter mount, and an EMI gasket used with the optical connector mounting system shown in FIG. 1.

Referring also to FIG. 2, the mounting system 10 generally comprises an optical connector adapter 12, a mount 14, and gasket 82. The adapter 12 is installed in the mount 14. The mount 14 is mounted in turn to the panel B or support member. The gasket 82 is connected to the mount 14 to prevent EMI emissions through the hole 3 in the panel B. The mount 14 holds the adapter 12 at an angle relative to the panel B. A twist boot 100, 100' is mounted on the conductor T,T' of the connectorized conductor assembly A,A'. The boot 100, 100' supports the conductor T,T' to provide a desired bend radius and prevent the conductor from kinking when the connector T,T' is connected to the mount 14.

As seen in FIG. 1, the connectorized conductor assemblies A,A' are substantially the same, and will be described in greater detail with specific reference to conductor assembly A. Connectorized conductor assembly A generally comprises conductor T and connector C. In the preferred embodiment the conductor is a multi-fiber optical conductor having a number of optical conductor fibers O therein. FIG. 1 shows conductor T having four optical conductor fibers O, for example purposes, and in alternate embodiments the conductor may have any suitable number of optical conductor fibers, such as for example six fibers, eight fibers, twelve fibers or more as desired. The optical conductor fibers O may be arrayed in a row R within the conductor T as shown in FIG. 1. In alternate embodiments, the optical fibers may be arrayed in a number of rows. The conductor T may be a flat ribbon fiber cable or other suitable cable. The conductor T may have an outer sheath (not shown) made of braided metal or plastic. As seen in FIG. 1, the conductor may have a generally rectangular shaped cross-section with major sides T2 (only one major side T2 is shown in FIG. 1, the opposite side being hidden) and minor sides T1, T3. In alternate embodiments, the conductor may have any other suitable cross-section such as elliptical, oval, or round. As seen in FIG. 1, the row R of optical fibers O is disposed along an axis of symmetry X of the conductor T. The major sides T2 of the conductor T may be aligned substantially parallel with axis of symmetry X. Hence the row R of optical fibers is substantially parallel to the major sides T2 of the conductor.

Figure 3:
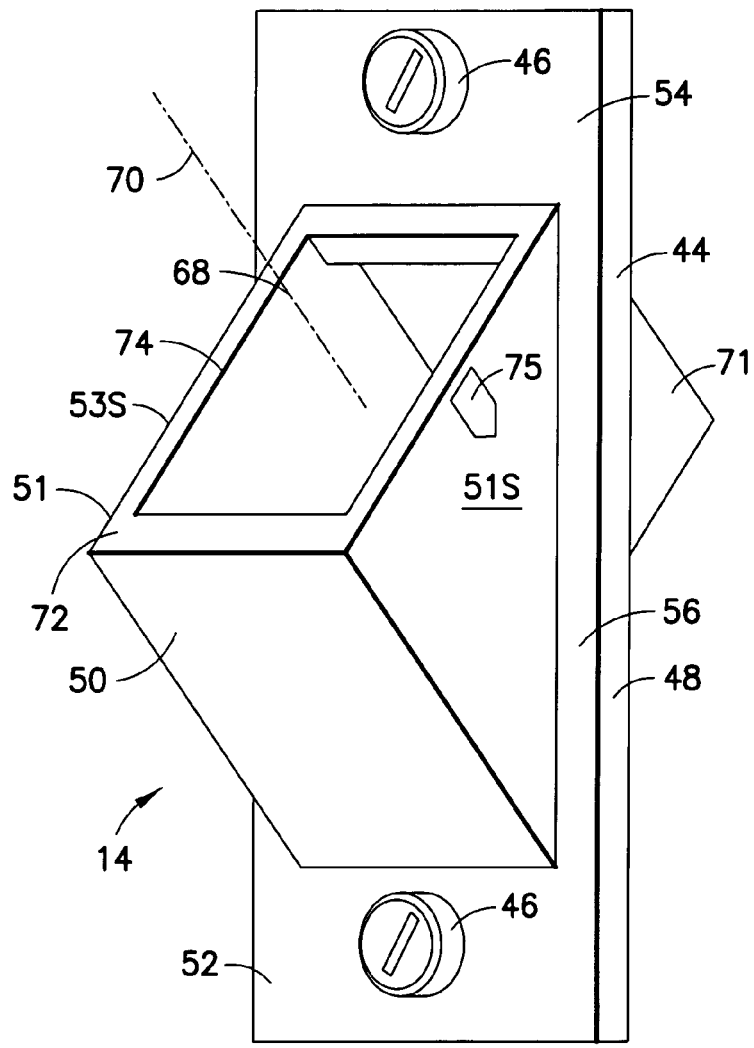
FIG. 3 is a perspective view of an opposite side of the optical connector adapter mount shown in FIG. 2.
Figure 4B:
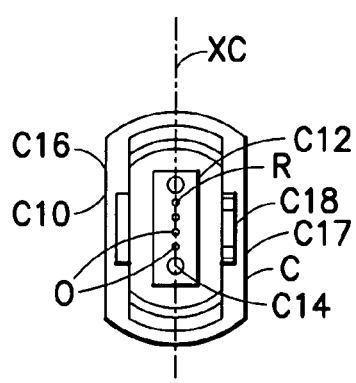
FIGS. 4A–4B respectively are a partial cross-section elevation view of the optical connector adapter in FIG. 2, and a front end elevation view of a connector used with the mounting system shown in FIG. 1.

As can be realized from FIG. 1, the optical fibers O in conductor T are terminated in connector C. Referring now to FIG. 4B, there is shown a front elevation view of connector C. Connectors C, C' of optical conductor assemblies A, A' may be MPO or MTP® type connectors (and are shown as such in FIGS. 1 and 4B) though the present invention is equally applicable to simplex or multiplex SC, LC, or ST type connectors or any other suitable type connector. As seen in FIG. 3, connector C (which is substantially the same as connector C') generally includes a connector housing C10 and an inner core or ferrule C12. The optical conductor fibers O are held in the ferrule C12. The optical fibers O are shown as being disposed in the ferrule in a row R aligned with axis XC (similar to the arrangement of the fibers in the conductor T). In alternative embodiments, the optical fibers may be terminated in the connector in any desired arrangement. The connector may have guide pins C14 for aligning the connector to a mating connector (not shown) in the adapter.

Referring now again to FIG. 1, the panel or frame member B has holes 3 for mounting adapter mount assemblies. In the embodiment shown, the inner panel B has four holes 3, though the panel may have any number of holes (such as for example, one hole). The holes 3 in the panel are sized to receive a rear portion 71 of the adapter there through. In the preferred embodiment, the holes 3 are oriented so that the adapter 14 is mounted in a vertical orientation. In this position, the connector C, C' on the conductor assemblies A, A' is inserted into the adapter 12 with the axis along which the conductors are arrayed (such as axis XC in connector C) aligned with a vertical axis Y. (as will be described in greater detail below). This allows the adapter mount assemblies to be mounted closer together (in a horizontal direction) thereby reducing the area on the electronic device (not shown) used for effecting connections to the device. The centerline 90 of each hole 3 is substantially normal to the panel B.

Figure 4A:
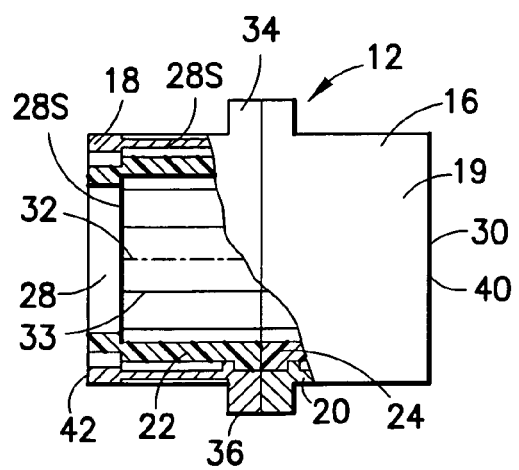

Referring also to FIG. 4A, the adapter 12 is configured to effect end to end mating of opposing conductors. The adapter 12 generally comprises a housing 16 comprised of two outer housing pieces 18, 20, and two inner housing pieces 22, 24. However, in alternate embodiments any suitable type of adapter could be used. For example, the adapter could be a MTP-MTP, MTP-MPO, MPO-MPO adapter or any other suitable type of adapter. The adapter 12 has two receiving areas 28, 30 for receiving the connectors to be mated (FIG. 1 shows only the connector C, C' received into one of the receiving areas for example purposes). As can be realized from FIGS. 4A, 4B, the receiving areas 28, 30 of the adapter are sized and shaped to conformally hold the corresponding connector C, C' within. The receiving areas 28, 30 may have polarizing features such as for example keyway 33 (formed into a side wall of the receiving area), the side walls 28S of the receiving area, or any other suitable facets which conformally interface with features on the connector C, C' to allow insertion of the connector into the receiving area in a predetermined orientation. By way of example, the connector housing C10 has a generally rectangular shape (see FIG. 4B). The major sides C16, C17 is generally parallel to Axis XC along which the row R of optical fibers O is disposed. The aperture of the receiving areas 28, 30 in the adapter, is also generally rectangular conforming to the shape of the connector housing C10. Hence, the connector C may be inserted into the receiving area with the major side C16 of the connector housing aligned with the major sides 19 of the adapter 12. Also, as can be realized from FIGS. 4A–4B, axis XC along which the row optical fibers O is disposed in the connector ferrule C12, is aligned generally with the major sides 19 of the adapter when the connector C is located in the adapter 12. In addition, a key C18 projecting from one side C17 of the connector housing C10 interfaces with keyway 33 in the adapter 12 to allow the connector C to be inserted into the corresponding receiving area 28, 30 in one orientation. In alternate embodiments, the adapter and connector may have any other suitable interlocking features, such as interlocking grooves and splines, or guide bores and pins, which polarize the orientation of the connector in the adapter. The connector C, C' is received along a centerline axis or axis of symmetry 32 into the corresponding receiving area 28. The opposing connector (not shown) is inserted into the opposite receiving area 30 also along axis 32. The pieces 18, 20, 22, 24 are preferably comprised of plastic and may be secured to each other by any suitable means such as for example ultrasonic welding. The inner pieces 22, 24 form deflectable snap-locks for the connectors C, C' of the optical conductor assemblies A, A'. The outer pieces 18, 20 form mounting flanges 34, 36. The flanges 34, 36 may have fastener holes (not shown). The adapter 12 can be attached to another member without the mount 14, such as a printed circuit board or back panel (similar to panel B), with one of the ends 40 or 42 extending through a hole in the member; generally perpendicular to a plane of the hole and the member. Thus, the adapter 12 can be attached to another member as a perpendicular type of adapter, with the centerline axis 32 parallel or coaxial with the centerline axis of the hole which the adapter is located in. However, as noted above, in alternate embodiments any suitable type of adapter could be used.

The mount 14 of the present invention is provided to allow the perpendicular type of adapter 12 to be connected to another member in a non-perpendicular or angled type of connection. Referring also to FIGS. 2 and 3, mount 14 comprises a conductive (e.g.: metal) one-piece member or housing 44 and fasteners 46 (see also FIG. 1). In an alternate embodiment the housing 44 could be comprised of multiple members, could be comprised of any suitable material(s), and could have any suitable shape. The fastener 46 in this embodiment generally comprises a nut and bolt, but any suitable type of fastening system could be provided including a fastener or fastening system integrally formed with the housing 44.

The housing 44 generally comprises a first mounting section 48 and a second adapter connection or housing section 50. The first section 48 generally comprises a bottom end 52, a top end 54 and side flanges 56. The first section 48 forms a generally planar surface 58 on one side of the flanges 56, top end 54 and bottom end 52. The top end 54 and bottom end 52 include a suitable holes 66 for the fasteners 46. However, in alternate embodiments the first section 48 could have any suitable shape which is adapted to attach the mount to the frame B. The mount 14 could also be shaped such that it does not extend through the hole 3 in the frame B.

The housing section 50 generally comprises a box or tube shaped section 51 located between the two ends 52, 54. However, the housing section 50 could have any suitable shape adapted to connect the adapter 12 to the mount. In this embodiment, the tube shaped section 51 has a through-hole or aperture 68 with an axis of symmetry 70 which is angled relative to the mounting section 48 and the plane of the surface 58. In a preferred embodiment the angle is about 45°. However, any acute angle could be provided. As seen best in FIG. 3, in the preferred embodiment the aperture 68 in the tube shaped section 51 has a rectangular shape generally corresponding to the rectangular shape of adapter 12. For instance, the dimensions of aperture 68 may be the same as the outer dimensions of an adapter (piece 18, 20). Accordingly, the adapter 12 may be inserted into aperture 68 with major sides 19 positioned along sides 51S, 52S of the tube shaped section 51 (see FIG. 3). In alternate embodiments, the tube section and aperture therein may have any suitable shape, allowing the adapter to be inserted into the aperture in any desired orientation relative to the tube section. The tube shaped section 51 includes an end face seating surface 72 at an entrance 74 into the aperture 68. As seen best in FIG. 3, the seating surface 72 may surround the entrance 74 of the aperture. In alternate embodiments, the seating surface may be limited to a pair of opposing sides of the entrance. In other alternate embodiments, the top end of the mounting section may have a recess formed therein with a surface so disposed as to form part of the seating surface at the top of the entrance. When the adapter 12 is inserted into the aperture, the mounting flanges 34, 36 of the adapter rest against the seating surface 72. The seating surface 72 may be generally orthogonal to the axis of symmetry 70 so that the adapter 14 is stably positioned in the aperture 68 with the centerline axis 32 of the adapter 12 substantially aligned with the axis of symmetry 70 of the aperture in the housing section 50. In alternate embodiments, the seating surface may have any other suitable angle relative to the axis of symmetry of the aperture in the mount. As shown in FIG. 3, the housing section 50 may be provided with an aperture 75 or porthole to polarize the orientation of the adapter 12 in the housing 50, and to indicate that the adapter is in the installed position. In FIG. 3, one aperture 75 is shown, for example purposes, located in a side wall 51S of the tube shaped section 51. In alternate embodiments, the housing section of the mount may have any suitable number of the polarizing apertures located in any of the outer walls of the tube shaped sections. Aperture 75 receives a conformal detent or projection (not shown) from the side 19 of the adapter, when the adapter 12 is inserted into aperture 68. The projection is located on the adapter side to enter into the aperture 75 when the adapter reaches the installed position in the mount housing 50. This provides a visual and aural indication (e.g. a snapping sound may be generated when the projection enters the aperture 75) to the user that adapter 12 is installed in the mount. The projection prevents the adapter from being installed in an undesired orientation.

In a preferred embodiment the adapter 12 is fixedly attached to the housing 44. For example, the two housings 44 and 40 could be ultrasonically welded to each other, or bonded to each other, or mechanically attached to each other by a spring clip or snap-lock latch system. However, any suitable connection could be provided. In an alternate embodiment features of the adapter 12 could be integrally formed with the housing 44. Thus, features of the present invention could be comprised in a dedicated angled adapter that did not use a perpendicular type adapter to form a mount/adapter assembly. However, the present invention provides the feature of the ability to use a single type of adapter to provide either a perpendicular type of mounting arrangement for connecting multi-fiber connectors C, C' perpendicular to a plane of a planar section of another member, or a non-perpendicular or angled type of mounting arrangement for connecting multi-fiber connectors C, C' to the planar section at an acute angle to the plane merely by additional use of the mount 14.

Referring again to FIG. 2, the gasket 82 is substantially flat and may be cut or stamped from sheet metal of suitable thickness. The metal is preferably phosphor-bronze, or cartridge brass, though the gasket may be formed from any other suitable conductive sheet metal. As can be seen in FIG. 2, gasket 82 has a generally rectangular shape and is sized to generally cover the planar seating surface 58 of the mount's mounting section 48 (see FIG. 2). In alternate embodiments, the gasket may have any suitable shape and size. Gasket 82 has a hole 103 which may be stamped or cut therein. As seen in FIG. 2, the hole 108 is generally rectangular in shape and is sized to admit a diagonal section 71 (see FIG. 2) of tube housing 51. Hole 108 extends sufficiently so that when gasket 82 is seated against seating surface 58 of the mounting section 48, the hole 108 allows unencumbered access to the bottom 69 of the aperture 68 in the tube housing 51. The gasket 82 may be provided with spring tabs (not shown) to bias the gasket 82 against the metal frame of the mount 14 and the panel B when the mount assembly is mounted to the panel. The gasket 82 may also be provided with one or more holes (not shown) for fastening the gasket to the panel B or mount 14. The gasket may also be provided with any other suitable fastening means, such as spring clips or catches for attaching the gasket to the panel. A suitable gasket is disclosed in U.S. patent application Ser. No. 09/909,608, filed Jul. 20, 2001, which is incorporated by reference herein in its entirety.

As can be realized from FIG. 1, the gasket 82 is assembled with the mount 14 before the mount is mounted on the panel B. To assemble the mount 14 and gasket 82, the gasket is merely placed against the seating surface 58 of the mount. As noted before, a diagonal section 71 of the housing 50 extends through the gasket hole 108 when the gasket is seated on surface 58. The adapter 12 may be installed in the mount 14 before or after the gasket 82 is placed on mount 14. After placing the gasket 82 on the mount, the mount 14 is connected to the panel B. The mount 14 is positioned to align with a corresponding one of the holes 3 in the panel B. The diagonal portion 71 of the mount 14 is inserted through the corresponding hole 3 in the panel B, and the mounting section 48 is placed against the panel B. Thus, the mount 14 (and the adapter 12 therein) is mounted to the panel B in the vertical configuration shown in FIG. 1. In this configuration, sides 515, 525 of the mount 14, and sides 19 of the adapter 12 held in the mount, are substantially vertical. Fasteners 46 may be inserted through mounting holes 4 in the panel and holes 66 in the mounting section 48 to secure the mount 14 to the panel B. Tightening of fasteners 46, clamps the gasket 82 between the mounting section 48 of the mount 14 and panel B. Gasket 82 hence effects grounding contact between the metal mount 14 and panel B around the hole 3 in the panel through which the mount is inserted. This shields against EMI emissions through the panel hole 3.

With the adapter 12 connected to the mount 14, and the mount 14 connected to the panel B, the centerline 32 of the receiving areas 28, 30 is angled relative to the centerline 90 of the hole 3. In a preferred embodiment, the centerline 32 of the adapter may be angled relative to the hole centerline 90 at about 45°. However, any suitable acute angle could be provided. Thus, the connectors C, C' can be connected to panel B at angle relative to the plane of the panel and hole 3. Thus, as can be realized from FIG. 1, the angled connection has a smaller space envelope compared to a connection where the connectors are orthogonal to (i.e. aligned along the centerline of the hole in) the panel B. Accordingly, the free space provided adjacent to the panel in order to allow insertion or removal of the connectors C, C' may be reduced in comparison to conventional orthogonal connection arrangements. Also, the angled connection shown in FIG. 1, provides increased safety (over orthogonal connections) to a user who removes the connector C, C' from the front of the panel B. More specifically, because of the angled mount 14, if the connector C, C' is removed from the adapter 12, light passing out of the adapter will be directed downward towards the ground or floor and away from the user's eyes. Thus, there is significantly reduced risk that the light will impact the user's eyes and perhaps cause damage to the user's eyes.

With the mount 14 and adapter 12 mounted to the panel in the vertical orientation shown in FIG. 1, the connectors C, C' inserted into the adapter 12 are also disposed in a vertical configuration. As noted before, in the vertical configuration the row R of optical fibers O (arrayed along axis XC) in the connector C is generally vertical. Axis XC is substantially aligned with vertical axis Y as shown in FIG. 1. Also, the conductor T at the rear end of the connector C is positioned with its major sides T2 being substantially vertical. As seen in FIG. 1, the conductor T droops down from the connector C. When in the vertical configuration shown in FIG. 1, the slender cross-section of the conductor T (i.e. height (T2) much larger than width (T1, T3) causes the drooping portion of conductor T to twist. The conductor boot 100, 100' controls the twist of the conductor T, T' thereby avoiding the kinking of the conductor and damage to the optical fibers O therein.

Boot 100, 100' preferably is a one piece member, injection molded or cast from an elastomeric material, such as for example, neoprene or foam rubber. In alternate embodiments, the boot may be made from plastic or metal. Boots 100 and 100' are substantially the same and thus will be described in detail below with particular reference to boot 100. The boot 100 has a rear section 102, a mid-section 104, and a front section 106. The front and rear sections 106, 102 may be substantially straight. The mid-section 106 of the boot is curved at a desired radius, and extends through a desired arc, in order to provide the conductor T extending through the boot with an appropriate bend that does not degrade the transmission properties of the optical fibers O in the conductor. In the preferred embodiment, the mid-section 104 extends through an arc of about 35° at a radius of about 1.0 inch. The degrees of arc and radius of curvature of the mid-section may vary until the cross-sectional dimensions of the conductor. For example, for a wider or thicker conductor, the radius of curvature may be greater. The boot 100 preferably includes a conductor passage 108 extending through the boot. The conductor passage 108 is sized to form a close fit around the conductor T, when the conductor is placed through the boot. The passage 108 has a generally bent and twisted shape. The curvature of the passage 108 generally follows the curvature of the mid-section 104 of the boot. The twist of the passage 108 is gradual along the length of the boot and results in the passage cross-section at the rear section 102 being oriented at about 90° to the passage cross-section at the front section 106 of the boot. In alternate embodiment the twist of the passage may be more or less.

The connector T may be placed into the boot 100 when the conductor is terminated to the connector T. For example, the conductor T may be inserted into passage 108 through the passage opening in the rear section 102 of the boot. The conductor T may then be fed through passage 108 in the boot 100 and terminated to the connector C. With the conductor T inserted in the boot 100, the boot 100 may be connected to the connector C. In the preferred embodiment, the front section 106 of the boot 100 is shaped to be received in a rear section C14 of the connector housing C10. The front section 106 of the boot 100 engages or is otherwise interlocked with the rear section C14 of the connector housing C so that the boot 100 is supported from the rear section C14 of the connector. The boot 100 in turn supports the conductor T. The boot 100 also restrains the conductor T providing it with a curved and twisted shape conforming to the passage 108 in the boot 100. The connector C may thus be connected to the adapter 12 in the vertical configuration, shown in FIG. 1, without kinking the conductor T. at the front section 106 of the boot, the conductor and thus, the row of optical fibers 0, has the same orientation as in the connector. The row of optical fibers 0 at the location where the fibers exit the front of the boot is aligned with axis XC which is vertical. At the rear section 102 of the boot 100, the row of optical fibers O disposed generally along axis X is substantially horizontal. The boot 100 provides a smooth, kink free transition of the conductor T from the vertical orientation at the connector to the stable horizontal position (i.e. axis X is horizontal) of the slender conductor drooping from the boot 100. It is the kink free bent and twisted shape of the conductor T, provided by boot 100 which allows mating of the MPO/MTP connector C to the angled adapter 12 in mount 14 in the vertical configuration shown in FIG. 1 while ensuring there is no degradation in the signals transmitted through the connector.

Referring now to FIG. 5A there is shown a perspective view of an optical connector mounting system 210, incorporating features of the present invention in accordance with another preferred embodiment. FIG. 5B is another perspective view showing the mounting system 210 installed in a hole 203 of panel 200B which is substantially similar to panel B described previously and shown in FIG. 1. As can be realized from FIG. 5B, mounting system 210 is similar to mounting systems 10, 10', shown in FIG. 1 and described before, in that the mounting system 210 enables connectors (not shown but similar to MPO or MPT connectors C, C' in FIG. 1) which are mated to each other inside an adapter 214, to be mounted to the panel 200B at an angle relative to an axis 290 normal to the panel. Mounting System 210 generally comprises adapter 214, EMI gasket 282, and fasteners 246. The EMI gasket 282 is mounted to adapter 214. Fasteners 246 are used to secure the adapter 214 to the panel 200B.

Figure 6:
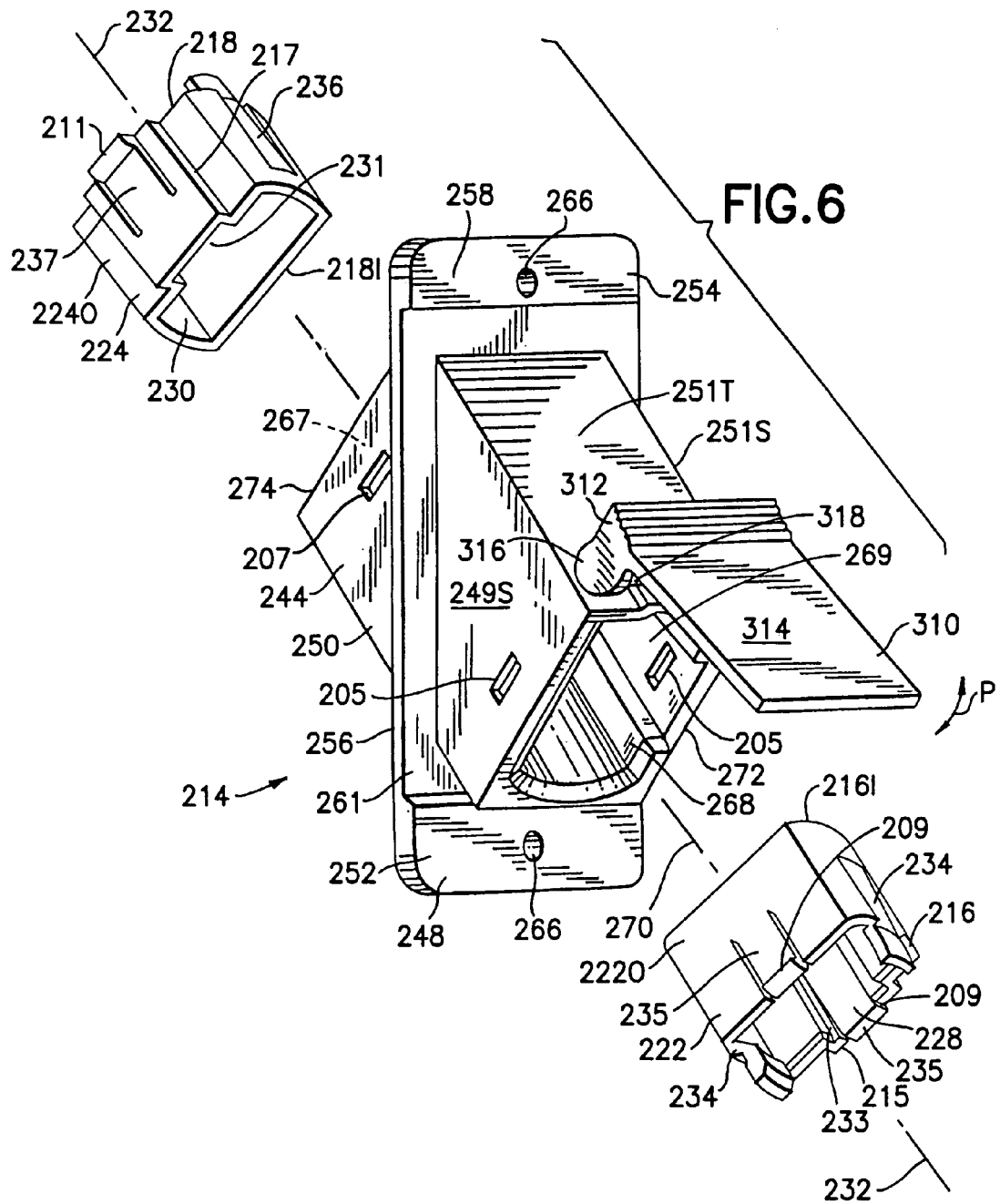
FIG. 6 is an exploded perspective view of the adapter assembly in FIG. 5A.

In greater detail now, and with reference also to FIG. 6, the adapter 214 generally comprises an outer frame or housing 244, inner latch housings or inserts 222, 224 and door or cover 310. Latch inserts 222, 224 are located in the outer housing 244. The door 310 is pivotably mounted to the outer housing 244 at one end 272. As can be realized from FIG. 6, adapter 214 is configured to effect end to end mating of opposing connectors. In alternate embodiments, the adapter may be configured to effect any desired type of mating between connectors intended to be connected to each other inside the adapter.

Still referring to FIG. 6, latch inserts 222, 224 are similar except as otherwise noted below to inner housings 22, 24 described before and shown in FIG. 4A. Latch inserts 222, 224 have a generally tubular section 216, 218 made of plastic or any other suitable material. Each latch insert 222, 224 has a receptacle or receiving area 228, 230 for a mating connector similar to connectors C, C' in FIG. 1. In FIG. 6, the latch inserts 222, 224 are shown, for example purposes, as being configured for conformally receiving MPT or MPO connectors. In alternate embodiments, the latch inserts may be configured to receive therein any other desired type of connector, such as for example SC, or LP connectors. One example of latch inserts suitable for use with the present invention is described in U.S. patent application (PAR)titled "Optical Connector Adapter With Latch Inserts", by Hung Viet Ngo, filed Mar. 5, 2002.

As noted before, the receiving area 228, 230 of each insert conforms to the shape of the connector (similar to connector C, C') received therein. Keyway 231, 233 provides a polarizing feature allowing the connector to be inserted in a predetermined orientation as will be described further below. Each insert has a pair of resilient latch arms 234, 236 to engage and lock the connector in the receiving area. Each insert also has another pair of resiliently flexible latch arms 235, 237 (see FIG. 6) for locking the inserts 222, 224 to the outer housing 244 as will be described further below. Each latch arm 235, 237 has an outward projection 209, 211 which is located at the end of the arm proximate the outward facing end of the insert.

The outer adapter housing 244 is a one piece member which in the case of a shielded adapter (as depicted in FIGS. 5–6) may be made of metal such as for example aluminum alloy or steel. In alternate embodiments, the outer housing may be made of plastic. The outer housing 244 comprises a mounting section 248 and a housing section 250. As seen in FIG. 6, the housing section 250 has a general tubular shape with passage 268 extending through the housing. In the preferred embodiment, the passage 268 has a general rectangular shape conforming to the outer surface 222O, 224O of the latch inserts 222, 224. This allows the inserts 222, 224 to be inserted into the passage, and when inserted to hold the inserts 222, 224 in alignment with each other. As seen in FIG. 6, the passage 268 is oriented so that the latch inserts 222, 224 are held in a vertical position in the housing 244. Accordingly, the mating connectors (similar to connectors C, C' in FIG. 1) are mated to the housing in a vertical orientation similar to that illustrated in FIG. 1. The passage 268 may include a guide channel 269 to guide insertion of the insert 222 inserted through end 272 into the passage. Guide channel 269 is formed into side wall 251S of the housing section. The insert 222 has a guide projection 215 which is shaped to complement the guide channel 269. As can be realized from FIG. 6, the passage 268 includes a second guide channel 267 to guide insertion of the opposite insert 224 inserted into passage 268 through end 274. The guide channel 267 is formed in side wall 249S of the housing section 250. Insert 224 has guide projection 217 for interfacing with guide channel 267. The guide channels 267, 269 may include a stop (not shown) positioned in passage 268 to stop insertion of the inserts 222, 224 when in the installed position (see FIG. 5A). The guide channels 267, 269 thus provides a polarizing feature to the opposite ends of the passage ensuring that inserts 222, 224 are installed in the predetermined orientation. In alternate embodiments, the orientation of the inserts may be reversed from that shown in FIG. 6. As seen in FIG. 6, sidewalls 249S, 251S of the housing section have apertures 205, 207. Apertures 205, 207 engage the respective spring loaded latch projections 209, 211 to lock the corresponding inserts 222, 224 in the installed position in the passage 268.

As seen in FIG. 6, in the preferred embodiment, the mounting section 248 is generally a flange which surrounds the tubular housing section 250. The mounting section 248 has a planar surface 258 which defines a seating surface for the mounting section. The housing section 250 and mounting section are angled relative to each other so that the center line axis, or axis of symmetry 270 of passage 268 in the housing is angled relative to the plane of surface 258. In the preferred embodiment, the angle is about 45°. In alternate embodiments, any acute angle may be used. In other alternate embodiments, the mounting section need not be a continuous flange, but may be a sectioned flange or a number of flanges forming co-planar or parallel planar surfaces. The mounting section 248 has fastener holes 266 in both the top and bottom sections 254, 252. The mounting section 248 also has a recess 261 formed into surface 258. The recess 261 extends along side portions 256, and across top and bottom sections 254, 252, thereby surrounding the housing section 250.

The cover 310 is preferably a one piece member which is made of plastic or any other suitable material. The cover has a general L shape with a mounting or base section 312 and a cover section 314. In the preferred embodiment, the base section is at the top and the cover section 314 depends from the base section. The base section may include a clevis 316, with a bore (not shown) for a pivot pin (not shown). The clevis 316 is configured to interface with a bored lug (not shown) on the top side 251T of housing section 250. The pin may be inserted through the bores in the lug and clevis to pivotally mount the cover 310 to the housing 250. The cover may be pivoted in the direction of arrow P between the open position shown in FIG. 6 and a closed position (not shown). A spring 318, such as a helically wound torsion spring may be placed around the pin to bias the cover 310 towards the closed position. The cover section 314 depending from the base section 310 is of sufficient length and width to cover the opening of passage 268 in end 272 when the cover is in the closed position.

The adapter 214 may be assembled by inserting the latch inserts 222, 224 into the passage 268. As noted before, insert 222 is inserted by sliding the insert 222 with end 216I first through end 272 of the housing into passage 268. Guide projection 215 on the insert is aligned with channel 269. The insert 222 slides onto the passage 268 until spring loaded latch projections 209 engage apertures 205. The apertures may provide both an aural and visual queue that the insert 222 is in the installed position.

Insert 224 is installed into the passage 268 through the opening in end 274 in a manner similar to that described for insert 222. Projections 211 automatically engage apertures 207 also giving an aural and visual indication that the insert 224 is in the installed position in the passage. Contact between the passage 268 and outer surfaces 222O, 224O maintains the centerline axis 232 of the receiving areas 228, 230 aligned with centerline axis 270 of passage 268. In other words, the receiving areas 228, 230 of the inserts 222, 224 in the outer housing 244 are aligned with each other, and hence the connectors received into areas 228, 230 are aligned so that the connectors may be mated together.

The one-piece outer housing 244 ensures that alignment between the receiving areas is very precise even though the receiving areas are angled relative to the mounting section 248 of the adapter 214. Thus, amongst other advantages, the adapter 214 with the one-piece outer housing 244 allows for angled housing and mounting sections 248, 250 while maintaining accurate alignment between the connector receiving areas 228, 230 in the adapter.

As shown in FIG. 5B, adapter 214 may be mounted to a panel 200B without using a mount. Prior to installing the adapter 214 on the panel 200B, the EMI gasket 282 may be mounted on the adapter. Gasket 282 is substantially similar to gasket 82 described before and shown in FIG. 2. Gasket 282 is seated into recess 261 in the mounting section 248 of the adapter. As seen in FIG. 5A, the rear 271 of the housing section extends through the hole 308 in the gasket. The adapter 214 may then be placed against the panel 200B, the rear section 271 of the adapter 214 extending through the hole 203 in the panel. Surface 258 of the mounting section is seated against the panel. The EMI gasket 282 is sandwiched between the mounting section 248 and the panel 200B. The depth of the recess 261 in the mounting section is less than the thickness of the EMI gasket which ensures that the gasket is compressed between the adapter and the panel all around the opening 203. This prevents EMI signals from entering through the hole 203. Fasteners 246 are inserted through holes 204 to secure the mounting system 210 to the panel. In this position, the centerline axis 270 along which connectors are inserted into the adapter 214 is angled relative to the panel surface and to the centerline axis 290 of hole 203 normal to the panel 200B. Cover 310 is positioned outside the panel 200B. Thus when a connector is not installed into receiving area 228, the cover is closed preventing dust or other particulate matter from entering the adapter, and also preventing light signals from a connector in the opposite end 274 from exiting the adapter which may not be desired.

Figure 7:
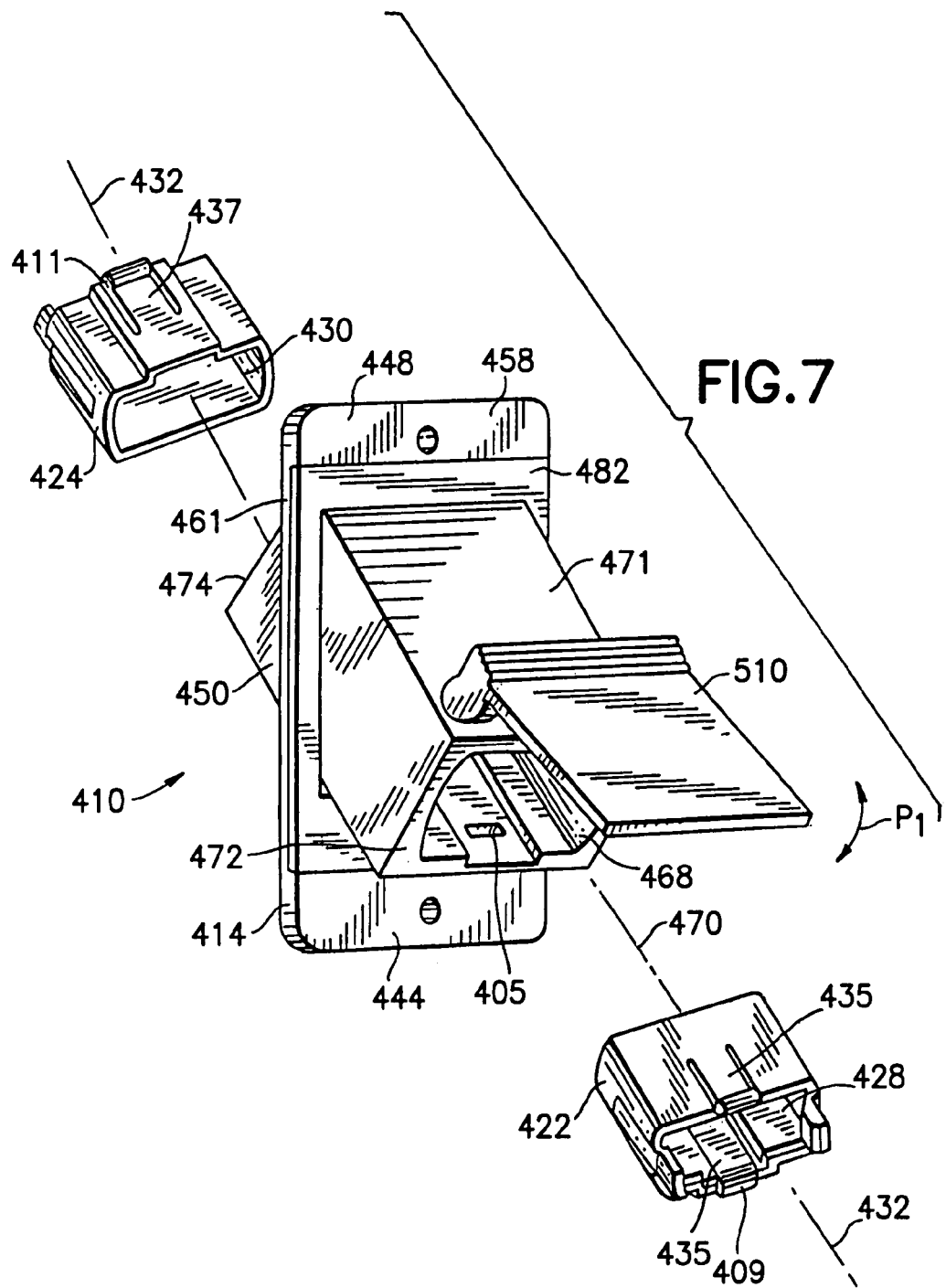
FIG. 7 is an exploded perspective view of another optical connector adapter assembly incorporating features in accordance with another preferred embodiment of the present invention.

Referring now to FIG. 7, there is shown a connector mounting system 410 in accordance with another preferred embodiment of the present invention. Except as otherwise noted below, mounting system 410 is generally similar to mounting system 210 described previously and shown in FIG. 5-6. Similar features are similarly numbered. System 410 comprises adapter 414, EMI gasket 482 and fasteners (now shown). The adapter 414 is an angled adapter wherein when the adapter is mounted to a panel (similar to adapter 214 mounted to panel 200B in FIG. 5B) the centerline axis 432 of the receiving areas 428, 430 is angled relative to an axis normal to the panel. Adapter 414 has an outer housing 444 which comprises mounting section 448 and housing section 450. The outer housing is a one piece section which may be cast or otherwise formed by any suitable method such as drop forging. The housing section 450 has passage 468 extending through the housing section. The passage has centerline axis 470 which, as seen in FIG. 7, is angled relative to the mounting section 448 and planar surface 458. The passage 468 is sized so that inner latch inserts 422, 424 can slide respectively into the passage 468 from opposite ends 472, 474 of the housing. In this case, the passage 468 is oriented so that the latch inserts are positioned in the housing in a horizontal position. Hence, the connector receiving areas 428, 430 are in a horizontal position and the connectors (similar to connectors C, C' in FIG. 1) are inserted into the receiving areas also in a horizontal position (i.e. axis XC is rotated 90° from the vertical position shown in FIG. 1 so that it is generally parallel to axis X). In this position, the slender ribbon conductor (similar to conductor A) is inherently stable when bent down. Thus, in alternate embodiments, a boot may not be used to restrain the conductor curvature and prevent kinking. The latch inserts 422, 424 have resiliently flexible latch arms 435, 437 with projections 409, 411 to engage apertures 405 (only one aperture 405 is visible in the view shown in FIG. 7) and lock the inserts to the housing. When installed into passage 468, the centerline axis 432 of the receiving areas 428, 430 of the inserts is aligned with centerline axis 470 of passage 468. Hence, the receiving areas 428, 430 of the inserts are also accurately aligned with each other. Cover 510 is pivotally mounted to one end 472 of the adapter, and can be pivoted (in a direction indicated by arrow P1) to a closed position where the cover 510 covers the opening to passage 468.

The mounting system 410 is mounted to a panel (similar to panel 200B in FIG. 5B) in a similar manner to that used for mounting system 210. Gasket 482 (which is substantially similar to gasket 282 in FIG. 5A) is seated into recess 461 in the mounting section 448 of the outer adapter housing. The adapter 414, with the EMI gasket thereon, is then seated against the panel, the rear portion 471 of the adapter extending through a hole in the panel in the preferred embodiment.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical connector adapter mounting system comprising:
   a multi-fiber optical connector with a row of multiple optical fibers which extend out of the connector;
   an optical connector adapter mount for mounting the optical connector to a panel, the mount comprising:
   a frame with a mounting section for attaching the mount to the panel, and a housing section with an aperture connecting the multi-fiber optical connector to the housing section;
   wherein the aperture in the housing section has an axis of symmetry which is slanted relative to the mounting section, and wherein the axis of symmetry of the aperture is angled relative to a normal axis of the panel when the mounting section is mounted to the panel and the connector connected to the housing section is oriented with a front end of the row of multiple optical fibers aligned generally vertically; and
   a twist boot supporting the row of multiple optical fibers extending from the connector, wherein the row of optical fibers twists along a bend in the optical fibers and the twist boot provides a twist path inside the twist boot which supports the optical fibers along the bend and along the twist of the row of fibers.

2. The mounting system as in claim 1, wherein the housing section extends through a hole in the panel when the mounting section is mounted to the panel.

3. The mounting system as in claim 2, wherein the aperture extends at least in part through the hole in the panel when the mounting section is mounted to the panel.

4. The mounting system as in claim 1, wherein the at least one connector is an MPO connector or an MTP connector.

5. The mounting system as in claim 1, wherein the aperture extends through the housing section, and the housing section is slanted relative to the mounting section.

6. The mounting system as in claim 1, further comprising an EMI gasket connected to the mounting section.

7. The mounting system as in claim 6, wherein the EMI gasket surrounds the housing section, and wherein the EMI gasket is sandwiched between the mounting section and panel when the mounting section is mounted on the panel.

8. The mounting system as in claim 1 further comprising an adapter mounted in the optical connector adapter mount, wherein the optical connector is attached to the adapter mount by the adapter.

9. An optical connector adapter mounting system comprising:
   a multi-fiber optical connector comprising a row of optical fibers;
   an optical connector adapter mount for mounting the optical connector to a panel, the mount comprising:
   a mounting section for attaching the mount to the panel; and
   a tubular housing section connected to the mounting section, the tubular housing section having an aperture connecting the multi-fiber optical connector to one end of the housing section;
   wherein the housing section is slanted relative to the mounting section, and when the mounting section is mounted to the panel the connector connected to the housing section is angled relative to a normal axis of the panel and the row of optical fibers extend from the connector with a generally twisted shape; and
   a twist boot on the row of optical fibers as the fibers extend from the connector, wherein the twist boot supports the row of optical fibers providing the row of optical fibers with their generally twisted shape.

10. The mounting system as in claim 9, wherein the row of optical fibers is substantially aligned along a first axis at a first location and is substantially aligned along a second axis at a second location, the second axis crossing over the first axis.

11. The mounting system as in claim 9, wherein when the mounting section is mounted to the panel the housing section extends at least in part through a hole in the panel.

12. The mounting system as in claim 11, wherein the connector is connected to the housing section extends through the hole in the panel.

13. The mounting system as in claim 9, wherein the twist boot is flexible.

14. The mounting system as in claim 13, wherein the twist boot has a curved portion and a straight portion, the row of optical fibers being curved by the curved portion of the twist boot.

15. The mounting system as in claim 14, wherein the twist boot provides the row of optical fibers with predetermined curvature and twist.

16. The mounting system as in claim 9 further comprising an EMI gasket connected to the mounting section.

17. The mounting system as in claim 9, wherein the connector is at least one of an MPO connector or an MTP connector.

18. The mounting system as in claim 9 further comprising an adapter mounted in the optical connector adapter mount, wherein the optical connector is attached to the adapter mount by the adapter.

19. An optical connector mounting system comprising:
   an adapter mount with a mounting section for mounting the adapter mount to a panel, and a housing section depending from the mounting section;
   an adapter located in the housing section for coupling with a multi optical fiber connector; and
   a twist boot connected to the connector, the twist boot twisting a row of optical fibers, terminated at the connector, along a length of the optical fibers, wherein when the connector is coupled to the adapter the twist boot twists the row of optical fibers so that the row of optical fibers along said length has a predetermined shape.

20. The system as in claim 19, wherein the connector is connected to the adapter in a vertical orientation with the row of optical fibers at the connector being aligned with a vertical axis, and wherein the predetermined shape of the row of optical fibers provided by the boot allows connection of the connector to the adapter in the vertical orientation.

21. The system as in claim 19, wherein the boot is a flexible boot.

22. The system as in claim 21, wherein the row of optical fibers are encased in a cable having an unsymmetrical cross-section with a major side and a minor side, the row of optical fibers being disposed along the major side.

23. The system as in claim 19, wherein the predetermined shape of the row of optical fibers is a generally twisted shape with the row of optical fibers being aligned with a first axis at the connector and with a second axis crossing over the first axis at another location along said length.

24. The system as in claim 19, wherein the housing section has an aperture with a through axis slanted relative to the mounting section, the adapter being located in the aperture of the housing section and being generally aligned with the through axis.

25. The system as in claim 24, wherein when the mount is mounted to the panel, the housing section extends through a hole in the panel and the through axis of the aperture in the housing section is angled relative to a center axis of the hole in the panel.

26. The system as in claim 25, wherein when the connector is connected to the adapter, the connector extends through the panel at an angle relative to the center axis of the panel.

27. The system as in claim 19, wherein the boot has a curved portion and a substantially straight portion, the row of optical fibers in the curved portion being curved and twisted.

28. The system as in claim 19, further comprising an EMI gasket connected to the mount.

29. An optical connector adapter assembly comprising:
a housing, the housing having a mounting section and a housing section with at least one passage extending through the housing for mating a pair of optical connectors to the housing; and
a pair of latch inserts connected to the housing and at least partially located in the at least one passage of the housing section, each latch insert being adapted for locking a corresponding connector of the pair of connectors to the housing, wherein the latch inserts are separately connected to the housing;
wherein the housing is a one-piece member, and the at least one passage in the housing section has a centerline axis which is slanted relative to the mounting section.

30. The adapter assembly as in claim 29, wherein at least one of the latch inserts has a spring loaded projection, and the housing section has a detent formed therein, the spring loaded projection being biased into the detent to lock the at least one latch insert in the housing.

31. The adapter assembly as in claim 29, wherein the at least one passage has a first guide channel for guiding insertion of a first one of the latch inserts into the at least one passage from a first end of the housing section.

32. The adapter assembly as in claim 31, wherein the at least one passage has a second guide channel for guiding insertion of a second one of the latch inserts into the at least one passage from a second end of the housing section opposite the first end.

33. The adapter assembly as in claim 29, wherein the housing is made of metal.

34. The adapter assembly as in claim 29, wherein the mounting section has a seating surface for seating the adapter assembly against a panel, the mounting section having a recess formed in the seating surface for receiving an EMI gasket therein, the recess in the mounting section surrounding the housing section.

35. The adapter assembly as in claim 29, wherein the housing section is generally tubular, and is substantially aligned with the centerline axis of the at least one passage.

36. The adapter assembly as in claim 29, further comprising a door pivotally mounted to the housing for covering an opening of the at least one passage at one end of the housing.

37. The adapter assembly as in claim 36, wherein the door is spring loaded to bias the door to a closed position.

38. The adapter assembly as in claim 29, wherein the connectors are MPO or MPT connectors.

39. The optical connector adapter assembly as in claim 29 wherein each latch insert is separately connected to the housing by a respective spring latch connection.

40. The optical connector adapter assembly as in claim 29 wherein each latch insert is connected to the housing proximate respective opposite ends of the at least one passage.

41. An optical connector mounting system for mounting a pair of opposing optical connectors to a panel, the system comprising:
an outer adapter housing with a frame having a mounting section and a housing section, the mounting section being adapted for mounting the outer adapter housing to the panel, the housing section having a passage extending therethrough for receiving along a centerline axis of the passage the pair of opposing optical connectors; and
a pair of inner adapter housings located in the passage, wherein each inner adapter housing is adapted for locking a respective one of the pair of opposing optical connectors in the passage, wherein the pair of inner adapter housings are separately spring latch connected to the outer adapter housing proximate opposite ends of the passage;
wherein the housing section of the outer adapter is slanted relative to the mounting section, and wherein when the mounting section is mounted to the panel, the housing section of the outer adapter housing extends through a hole in the panel and the centerline axis is angled relative to another centerline axis of the hole in the panel.

42. The system as in claim 41, further comprising an EMI gasket mounted to the outer adapter housing, wherein when the mounting section is mounted to the panel, the EMI gasket is sandwiched between the mounting section and the panel.

43. The system as in claim 41, further comprising a door pivotally mounted to the outer adapter housing, the door being pivoted relative to the outer adapter housing between open and closed positions, wherein in the closed position the door covers one end of the passage.

* * * * *